Dec. 16, 1969   J. W. DYER ET AL   3,484,631
ROTATING OR MOVING DEVICES FOR AMUSEMENT AND DISPLAY
Filed May 4, 1967   2 Sheets-Sheet 1
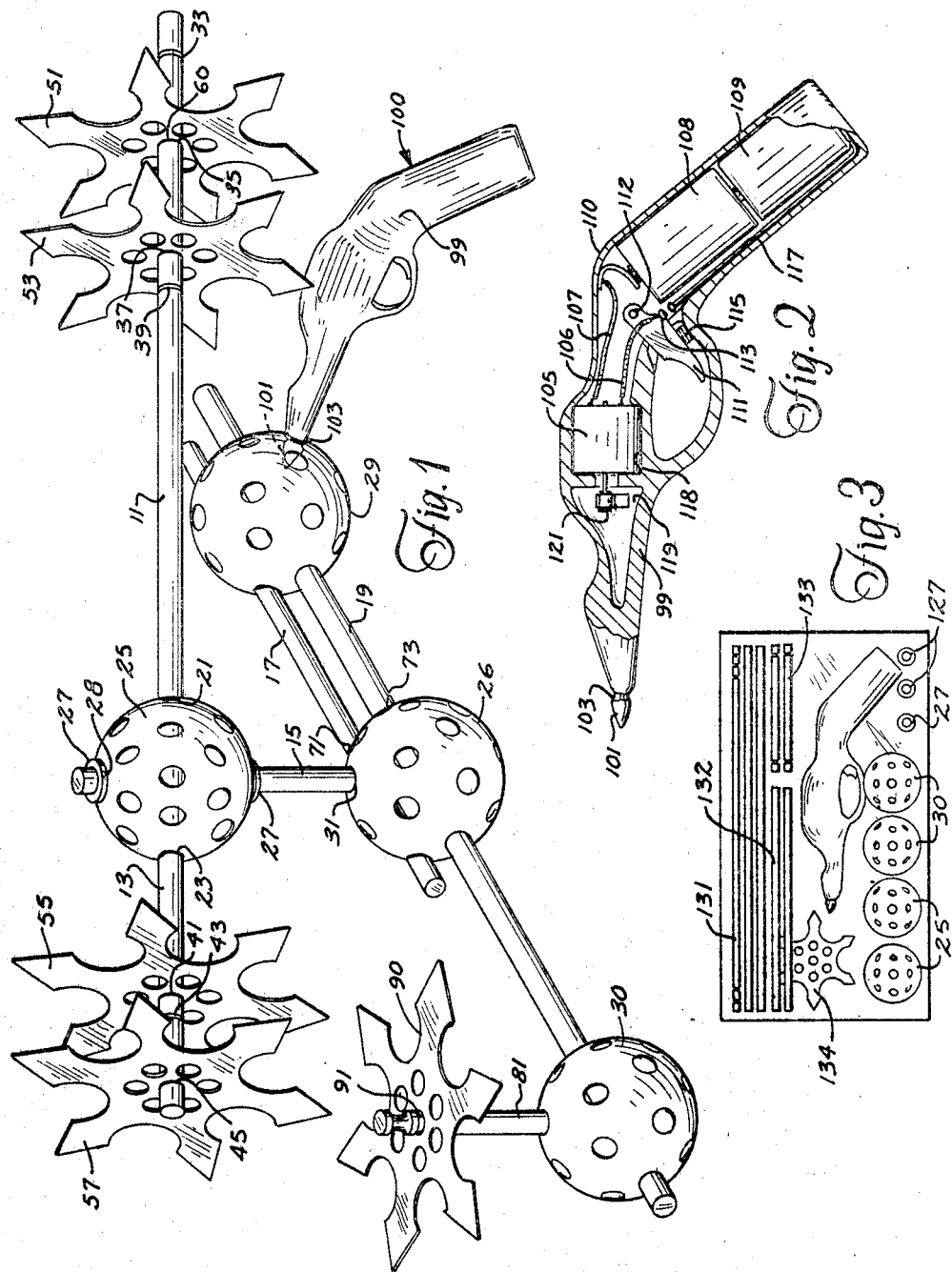
INVENTORS
JAMES W. DYER
MORRIS D. MUSIG
ASA B. COMPTON
BY
ATTORNEY Dec. 16, 1969   J. W. DYER ET AL   3,484,631
ROTATING OR MOVING DEVICES FOR AMUSEMENT AND DISPLAY
Filed May 4, 1967   2 Sheets-Sheet 2

INVENTORS
JAMES W. DYER
MORRIS D. MUSIG
ASA B. COMPTON
BY
Edwin M. Thomas ATTORNEY

United States Patent Office 3,484,631
Patented Dec. 16, 1969

3,484,631
ROTATING OR MOVING DEVICES FOR
AMUSEMENT AND DISPLAY
James W. Dyer, Annandale, and Morris D. Musig, Falls
Church, Va., and Asa B. Compton, Spencerville, Md.;
said Dyer assignor, by mesne assignments, to KMS
Industries, Inc., Ann Arbor, Mich., a corporation of
Delaware
Continuation-in-part of application Ser. No. 411,499,
Nov. 16, 1964. This application May 4, 1967, Ser.
No. 642,998
Int. Cl. H02k 33/00
U.S. Cl. 310—50                              1 Claim

ABSTRACT OF THE DISCLOSURE

Rotating and moving elements, such as spinning pin wheels, vibratory writing instruments, etc. are subjected to partly involuntary motion and partly manually controllable motion by imposing on them through flexible, elastic linkages, the vibratory effects of a high speed rotary driven eccentric weight. The linkages include perforate hollow elastic spheres and rod elements resiliently gripped thereby.

---

Figure 4:
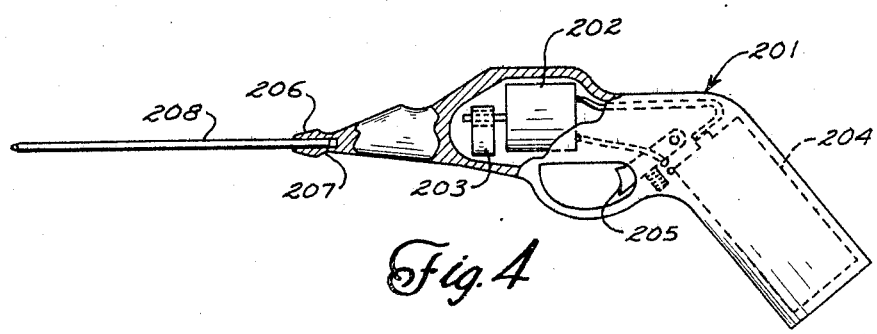

This application is a continuation-in-part of application Ser. No. 482,878, filed Aug. 26, 1965 now abandoned, which in turn was a continuation of Ser. No. 411,499, filed Nov. 16, 1964. The present invention relates to rotating or moving devices for amusement, for display, and for partly involuntary motions imparted to writing instruments, flying objects and the like. The invention is made up of component parts which can be connected together by elastic locking elements in various ways to make a variety of types of devices simulating airplanes, helicopters, rotary propellers, bizarre writing devices, and various other vehicles, implements and structures. In addition, individualistic artistic and/or geometric representations in motion and individual structural dynamic and static creations and designs of innumerable types may be made of the elements.

The devices preferably are made up of a plurality of separately engageable and detachable elements including elongated grooved rods, and appropriate connectors such as hollow elastic perforated elastic spheres which hold the components together by resilient frictional forces. In addition, rotary elements which are adapted to be mounted in various ways may be assembled for free rotation on their support or for throwing into space for spectacular flying display. A driver or motive power means for causing irrational and partially uncontrollable rotation of the rotary elements and other movable parts and for imparting unusual agitation motion to various parts is included. Other minor elements are preferably included too, such as constrictive fasteners which assist in relatively positioning and holding members and elements in operative relation to each other for their respective functions.

One object of the invention is to build a set of single, inexpensive components of readily available materials either available in prefabricated form or readily producible, which can be connected together for easy but stable assembly in such a way as to produce exciting, unusual, and energetic visual effects by motion. A further object is to so design such a set of elements that the parts can readily be assembled or taken apart for different structures and operations at will. The combined elements can thus assume many different forms. The parts are constructed so that irrational motion can be generated and readily imparted in a spectacular manner to various elements and at numerous and varied points of the assembly. The structure thus produced is extremely versatile, depending only on the desires and imagination of the user.

The rods or elongated rod like elements which are one important group may be in the form of plastic or wooden sticks, preferably slender and round, of different or varying lengths and of uniform or groups of different uniform diameters. Some at least of these rods are provided with peripheral or annular grooves, preferably a plurality of spaced peripheral grooves on single rod elements which grooves may be all alike or some of them may be dissimilar. A preferred arrangement has plural grooves, some of which at least are of two or more different depths on each rod that bears grooves.

These rods or sticks may vary considerably in length, preferably with small groups of similar lengths, and they may come in different diameters also, if desired. Preferably most of them are of similar diameter for economy and convenience of manufacture and packaging. A few special-purpose pieces of other diameters and sizes may be included, as noted hereinafter.

The connector elements, which for simplicity have been suggested as being spherical, hollow, perforate and elastic, also may be of different shapes and sizes. They are preferably made of a moldable or extrudable plastic resilient materials, such as polyethylene, polypropylene, or similar material. Preferably, they are capable of yielding under pressure or tension and of springing back when pressure or tension is released. Connectors in the form of hollow balls or spheres ranging in size from conventional practice golf balls, or smaller, up to baseball sizes or larger, have been found very satisfactory. Those having a multiplicity of holes or openings, some of which are smaller than the diameter of the rod elements and some as large or slightly larger are particularly suitable.

The rotary or mobile elements may be pin-wheel or propeller-like devices, e.g. disc-like wheels, star shaped pin-wheels, and the like of varied and preferably ornamental design. As a rule they are perforated for rotation upon a supporting rod or pin at a point more or less at their area centers, or centers of gravity. While such wheels may be varied in shape, as much as desired, those which are round, spoked, star-like, or of geometric design like large snowflakes, etc., are originally preferred. The shapes indicated on the drawing have been found to be particularly suitable because of interesting stroboscopic effects which they produce when rotating but others may be utilized.

The motive power or driving means for causing vibration consists of a small mechanical dynamically unbalanced power driven device. This driver is designed to set up rotation-inducing vibratory pulses which can be transmitted to various parts of the assembly without tearing it apart by vibration. It preferably includes an electrically driven motor, which may be battery or house current operated, with or without transformers. Alternatively, however, a spring motor, activated by manual winding, can be used, although the electric motor driven device is usually more satisfactory. A battery driven motor is used as a rule for assemblies intended for use as toys and for similar small devices that are to be carried around. For larger units, e..g. for movable display purposes, or wherever long continued driving or use of relatively large elements or complex assemblies is desired, the motor means may be driven by conventional house current, with or without transforming to a lower voltage, as will be obvious.

The structures and toys or display devices which can be constructed from a kit of assembly of the parts described above are characterized by several important and novel features. They are capable of withstanding substantial vibration without falling apart. This is not true of conventional stick and spool structures held together mainly by friction. They are capable of ready and easy assembly and disassembly, while the parts still will hold securely together, even during fairly rough handling or vigorous driving. The assemblies preferably are made up of individual components which are strong, tough, and durable, but are still quite light in weight and very inexpensive to produce. The component elements per se also are attractive and colorful. They make up easily into various structures which are artistic in design and outline. A child of tender years can assemble or disassemble them. At the same time the individual separate pieces are capable of withstanding quite rough handling and abuse without breaking or tearing. The rotary elements per se, such as star or pin wheel elements, propellors, etc., are designed to rotate freely on supporting axis elements without coming off their axles, even during energetic driving. This is so even when substantial stresses may be imposed by gravity, strong mechanical vibration, or fairly high centrifugal forces, etc.

All these characteristics have been achieved by utilization of simple and readily available materials and by using structural shapes and forms of components which are either available already on the market or may be easily made up. For example, highly suitable connecting elements are found in conventional perforate practice golf balls commonly made of resilient plastic such as polyethylene, polypropylene or "$C_2$–$C_3$" plastic rubber. The rods may be wooden or analogous fibrous materials such as impregnated or laminated paper tubes, reinforced fibre sticks, rods, or bars, etc. Preferably these, or some of them, are grooved for snap engagement in holes in the balls, so they are well held frictionally, at least by the smaller openings in the practice golf balls. Some of the openings in the connector balls, etc., are of a size to permit the sticks to rotate freely therein. Obviously, connectors larger than the conventional golf ball size, such as the commercially available perforated balls used for practice in various sports, e.g. indoor "baseballs," "soft-balls" and the like, may be used along with or in lieu of the golf balls. Also, balls of smaller size than practice golf balls, but having similar properties of stretchability, resiliency, etc., may be used. Usually they will be perforated to receive and hold the rods and other elements as set forth more fully below.

Alternatively, wooden or other substantially non-resilient or inelastic connector elements may be used, in which case the rod elements themselves should be elastic or resilient, i.e. rubber-like in their properties of compression and tension. In other words, at least one element of each connection should be elastic and resilient. A combination of wooden spools of the "Tinker Toy" type, with a set of plastic, rubber-like resilient rods, is useful. However, this combination may not be as satisfactory for most purposes as the combination of wooden, or laminated fibre annularly grooved sticks, used with perforate hollow resilient and elastic balls. Moreover, although, hollow plastic balls are preferred for many purposes, they can be replaced, in some cases at least, by other resilient connectors which need not be strictly hollow, such as the light-weight spongy plastic materials commonly used for making supports and connectors in various arts, such as floral and analogous displays. Thus materials such as balls of cork or of "Styrofoam," or other foamed rubber and plastic materials can be used. As long as the connection between the rod and the connector is a resilient and frictional gripping connection, not readily broken by vibration, with a fairly high coefficient of friction, it can be used. Simple stick and spool connections, of conventional types, i.e. where both connecting parts are hard and relatively inelastic, are generally not satisfactory because the vibrational energy put into the structure by the driver or power-input device usually will cause the parts to separate or fall apart after a short period of operation.

The motive power device is a cyclical vibrator operating at a fairly high cyclical rate. As indicated above, it may comprise an electrically driven motor or in the simpler forms and uses it may embody a wound spring motor if desired. Energy input requirements for display often extend over a substantial period of time and, hence, for most uses electric operation will be preferred. A particularly preferred driver for small toy sets is a battery operated "gun." It embodies a rotating motor carrying an eccentric weight, which eccentric has a substantial weight ratio as compared with the structure to be vibrated. Instead of attaching a separate eccentric to the rotating shaft or axle, the motor itself may be so built as to produce strong and rapid eccentric impulses. The eccentric attached to a simple motor shaft is usually preferred, especially where the device is small and readily portable as it is for children's toys.

It will be understood that the invention is not at all limited to toys but is applicable to larger or more elaborate structures. It may be used, e.g. for advertising display to be driven by motors of substantial energy and power, operating on conventional current. The assemblages also may be made mobile in part only, e.g. where a base part is not to be subjected to substantial movement.

The operation of the device depends largely on (1) setting up appropriate mechanical impulses of appropriate energy, amplitude, and probably of certain directional qualities, so far as rotation is concerned, in the system and (2) transmitting those impulses effectively and efficiently, possibly with amplitude and directional modifications, to the rotating devices. The combination of fairly rigid rod elements of limited flexibility or elasticity, such as a wooden stick, with a connector which is more elastic and which holds the stick in a firm but resilient grip by a sphincter-like elastic contraction of a connector, affords a particularly suitable means of transmitting the energy to the rotating elements. It appears to be more effective than more rigid types of connections. But, as noted above, the stick may be the more elastic or resilient and the connector may be more inflexible and less elastic.

For most uses, the rod elements are preferably simple wooden sticks. Some of these at least, and all, if desired, will have at least one and preferably several annular grooves near at least one end. For reversing and better interchangeability, both ends may be grooved alike. The grooves are so designed or of such width and depth, individually, as to accomplish their various needed functions. Thus, some of them will positively retain but support for free rotation a rotary element in the form of a propeller or "prop," wheel, disc, star, or the like. Other grooves may be designed to snap snugly into one of the perforations in the connector, so as to hold the stick fairly firmly through yieldingly against both rotational and translational displacement. By such means, the vibrational energy is transmitted much more effectively than in prior art devices. The rotary pin or starwheel elements for example, each have a bearing hole or opening near their geometrical centers, and their centers of gravity. This opening preferably is sized to require some stretching of the pin wheel or "prop" element to pass over the rod's usual diameter but also to ride for free rotation in at least one of the grooves in the rod. A plurality of rotary elements themselves may be mounted on a single stick for artistic, decorative, and interesting stroboscopic effects.

Each rotary element also may have other openings sized to receive a stick or rod, either tightly or for rotation, depending on the position of the element on the stick. Some of these openings may be utilized either for mounting or for interconnection of elements. As a rule, the central opening will be the supporting or bearing opening for rotation.

The rotary elements may be provided, however, with bearing openings of a size suitable to ride and rotate freely on ungrooved portions of the sticks or rods. In such a case, some obvious types of fastening or retaining elements may be used, such as elastic or stretchable washers or rings which can be pulled over the rod but contract tightly around it. These will keep the rotary elements in place. Such rings may be used, also, to retain a ball or connector on a rod or stick which has been inserted through holes in the ball large enough to permit free rotation on the rod.

The preferred driver or motive power means, which constitutes an important feature of this invention, is preferably made up in ornamental form simulating a gun or pistol, for example. It is designed (a) to set up the rotation-imparting pulses of desired energy, amplitude and other dynamic characteristics and (b) to transmit them effectively to the connected structure. The driver contains a rotary element, eccentrically weighted fairly heavily in proportion to the weight of the structure to be vibrated. The moving parts of the driver are arranged and driven so as to set up an effective eccentrical pulsation or vibratory motion. This motion is preferably quite energetic, producing striking effects and imparting a high degree of activity, particularly to rotatable parts. The driver is designed to connect with one of the structural elements, such as a perforate plastic ball connector or receiver, with an effective energy-transmitting engagement. As previously noted, a mere conventional frictional engagement, such as in a "Tinker-Toy" spool and stick construction, usually is unsatisfactory. It will not hold against the forces applied. Moreover, such a rigid connection is not as effective in transmitting the vibrational energy.

The driver unit per se is made with a body preferably of a solid but preferably somewhat resilient material, such as a plastic molding. Its connecting part, in the form of a shaped tip may be designed to be elastically held in sphincter tension in an opening in the connector, i.e. in one of the small tight-fitting holes in a hollow elastic or plastic ball. Alternatively, the driver may be designed to hold a stick, pencil, or other writing instrument and the like for purposes which will be explained further below.

Figure 5:
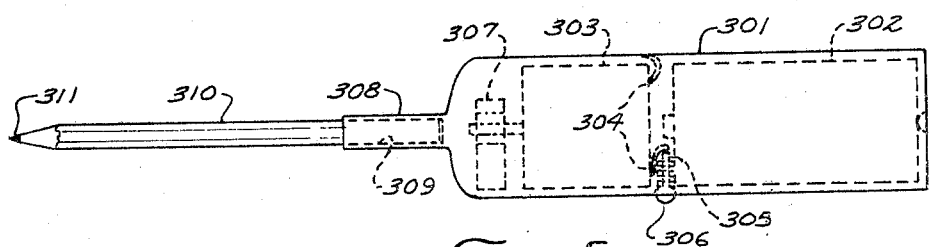
Figure 6:
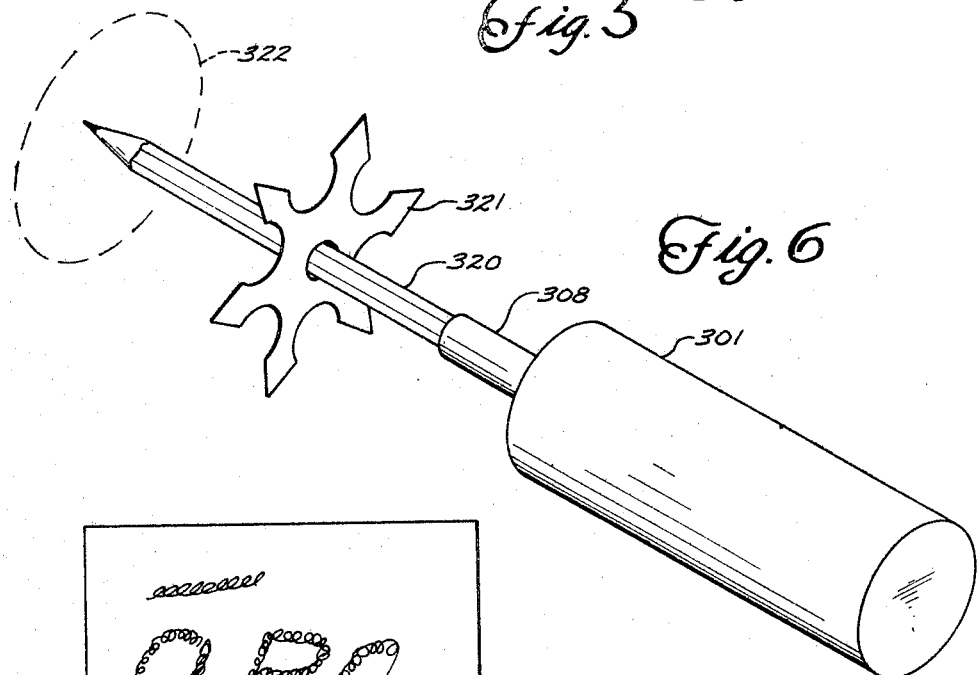
Figure 7:
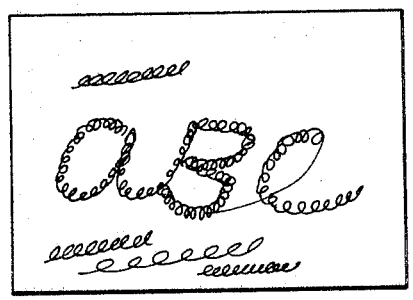

The general aspects of the invention having been described, a detailed description of a typical and representative embodiment will next be described, it being understood that various other forms come equally well within the purview of the invention. For this purpose, reference will next be made to the accompanying drawing, wherein:

FIGURE 1 shows an assembly toy or display device made up by simple manual assembly of a small set of component rods, connectors, etc., FIGURE 2 shows, partly in section, a motive source or driver gun, FIGURE 3 shows diagrammatically a kit of components as disassembled but capable of assembly into many different forms embodying the principles of the invention, FIGURE 4 shows a modification wherein the driver gun grips and supports a slender rod or stick which may be used for propelling rotary devices, or for writing, decorating, etc., FIGURE 5 shows a modification where a simple cylindrical "gun" holds a pen or other writing device, FIGURE 6 shows an arrangement wherein the "gun" can be used either for writing or for propelling rotating wheels, etc. through the air, and FIGURE 7 shows a typical example of unusual type of writing or ornamentation which can be done with devices of the types shown in FIGURES 4, 5 and 6.

Referring now to FIGURE 1, several rod or stick elements 11, 13, 15, 17, 19 and 81 are shown, each of which is fastened or mounted at one or both ends in a firm and resilient but somewhat elastic holder or connector. Thus rod elements 11 and 13, which may be the opposite end portions of a single stick, are inserted preferably in tightly fitting openings 21, 23 of a hollow plastic resilient sphere or ball 25. The latter is made of a tough rubber-like plastic material such as polyethylene, polypropylene or a "C$_2$–C$_3$" rubber, or equivalent elastic material. Obviously, other plastics may be used, such as synthetic or natural rubber, polyvinyl chloride, polyvinyl acetate and the like, or aromatic hydrocarbon polymer materials such as polystyrene. The ball 25 contains a substantial number of perforations, at least some of which are opposite each other diametrically. A ball actually used and shown in this specific case is a typical practice golf ball. The ball obviously may be made larger or smaller than a golf ball and it need not always be hollow. In lieu of a hollow sphere as shown, a foam type plastic material, in spherical or other form, such as "Styrofoam" or foam rubber, may be used, provided it has good elastic contraction to grip the sticks firmly. The hollow structure shown is normally preferred for convenience of assembly, superior elastic properties, light weight, and toughness.

The openings 21 and 23, as used in this instance, fit tightly with sphincter contraction in tension about the rod or stick elements 11 and 13. However, some other openings in the ball or connector may be larger than 21 and 23. In this case the openings 28 at the top and a similar one at the bottom are sufficiently large to permit insertion for free rotation of the stick 15. The ball 25, for example, is prevented from dropping lower, or from coming off the top., of stick 15 by constrictive resilient washer or ring elements such as 27. These each snap into an annular groove 28 (concealed in this case by the washers) on stick 15. They can also be used on a smooth ungrooved part of the sitck, if desired.

The lower end of stick 15 fits tightly in one or more of the smaller sized perforations such as 31 in a similar ball or sphere 26. By this means it will be understood that the upper ball 25, the assembly of sticks or rods 11, 13 and other parts which it supports, may rotate freely about the stick or rod 15. The latter serves as a supporting axis or axle.

The sticks or rod elements 11 and 13, etc., are provided respectively with a plurality of annular grooves 33, 35, 37, 39, 41, 43, and 45. See stick 131, FIG. 3, for example. Similar grooves, not shown in all cases, may be provided in some or all of the other sticks. In some of these grooves pin wheels or similar rotatable elements can be mounted for free rotation. The wheels here are shown as star or pin wheels 51, 53, 55, and 57. These each have a central opening, shown at 60 in the case of pin wheel 51. The central opening preferably is slightly smaller than the main diameter of the rod or stick 11, but large enough to permit free rotation when in one of the grooves 33, etc. The material of which the rotary wheels are formed preferably is much like that of the balls 25, 26, etc., having sufficient resilience and elasticity that it can be stretched over the larger or major diameter of the stick 11 and will snap into a groove such as 33, etc. The pin wheels also have other perforations 62 and may have points and radial members of varying and artistic design.

The connector 26 has a pair of rods or sticks 17 and 19 running through it, these being tightly and frictionally held in place by being pushed into restrictive openings 71, 73, etc., slightly smaller than the sticks. Another ball or connector 29 is shown mounted on sticks 17 and 19, similarly held firmly by frictional, constrictive forces. The rod or stick 19 is shown longer than rod 17, projecting beyond connector 26 so that another connector 30 can be mounted on its free end. This also is gripped frictionally and supports an upright stick 81. On the latter another pin wheel or "prop" 90 is mounted in groove 91 for free rotation.

The driving device 100 comprises a plastic molded body 99 in the general form of a pistol. It has a hard tip 101 with a tapered but preferably hollow point. An annular groove 103 is so formed that the tip can be pushed into one of the perforations in a connector ball 29, and snap into place, being resiliently but firmly held in place by contraction of the perforation around the groove 103.

As best shown in FIGURE 2, the driver or gun 100 contains a small electric motor 105 connected through wires 106 and 107 to a pair of batteries 108, 109, enclosed in the hollow stock or grip of the pistol 89. A removable or hinged closure 110 holds the batteries in place. A trigger 111, pivotally mounted on a transverse supporting pin 112, carries a contact 113 connected by wire 106 to the motor. A small spring 115 normally holds the trigger in the inoperative position but when the trigger is pulled against the spring it closes the contact 113 against the terminal 117 of as trip of metal which is in contact with the bottom pole of battery 109 and thus supplies driving current to the motor.

The motor carries on its drive shaft an eccentric weight 120 of sufficient mass and eccentricity to give substantial vibrational driving impulses to the gun body. The body is formed to house the motor and the eccentric as indicated at 118 and 119. The eccentric weight, which may be a simple bar of iron, etc., is held on the motor drive shaft by an elastic bushing 121 which fits snugly in an opening in the weight and also tightly constricts around the drive shaft. Thus the parts are assembled and secured together by elastic friction. By this means, the weight is securely but detachably fastened to the motor. This facilitates assembly. It also makes it convenient to replace the eccentric weight with another of different size or shape, if desired.

The motor operates preferably at rather high speed and the vibrational impulses transmitted to the tip 101 of the gun energize the assembled rods and connectors so that all the rotary elements, e.g., star wheels are rapidly set in rotation. These impulses are quite energetic and seem to have some directional components, favoring rotation in one sense over the other. By appropriate manipulation, however, some of the rotating pin wheels and other parts may be caused to rotate reversely with respect to others, producing very spectacular and dramatic effects. The agitation is generally proportional to the mass, degree of eccentricity and driving speed of the eccentric. Any of these characteristics may be varied by suitable design to obtain the desired type and quality of vibration. The whole assembly in motion presents a spectacular display.

FIGURE 3 shows a package of components assembled for convenience and for marketing, including the gun 100, a plurality of connectors 25, 30, etc. and various rods or sticks of assorted lengths indicated at 131, 132, and 133. A plurality of spinners or rotary elements 134 are included, together with rings or constrictive washers 27 and 127 for locking them in place. Other elements, and/or additional parts of different sizes, may be added as desired. A spring wound motor may be used in place of the electric motor 105. From this assortment of parts various structures may be made up, depending on the imagination of the user.

Referring now to FIGURE 4, a driver gun 201 is shown which is essentially like that previously described and may be identical. It includes a motor 202 which drives an eccentrically mounted weight 203. A battery 204, or two or more batteries, as desired, has suitable electrical connections so that when trigger 205 is pressed the circuit will be completed. The motor then drives the eccentric weight and sets up strong vibrations to be used as described below.

The tip 206 of the gun is similar to that of gun 100 previously described. This tip is of elastic material having a tubular construction 207 to receive a stick or writing instrument 208. The latter may be a ball point pen or stylus, or a lead pencil, crayon, or piece of chalk.

Instead of using a pistol shaped driver, the driver may be of cylindrical shape and held like a conventional handle or like a large pen or crayon. As shown in FIGURE 5, this comprises a hollow cylindrical barrel 301 containing one or more batteries 203, a motor 303 with electrical connections 304 adapted to make contact when a spring opposed plunger 305 is pressed in by a button 306. The connections are suitably insulated. As shown, the casing 301 may serve to connect the base terminal of the battery to one of the motor contacts and plunger 305, when pressed in, will bring a contact to bear against the other battery terminal.

Motor 303 drives an eccentric or an eccentrically mounted weight 307 to set up strong and rapid vibrational impulses. As in the case of FIGURE 4, the elastic tip 308 is hollowed at 309 to receive a pencil, stick or other writing device.

In using the gun of FIGURE 4 or the structure of FIGURE 5 for writing, the effect of the mechanical vibration is to impart to the stick or writing device impulses which cannot be entirely suppressed or controlled by the writer. In effect, involuntary motion is imparted to the pen, pencil, chalk, etc., so that a distinctive spiral or undulating pattern is imparted to the writing or drawing. This writing or drawing is still under general control of the writer but various distinctive or decorative undulations are added to his directing efforts. The vibrational energy is sufficient to impart artificial and involuntary uncontrollable embellishments to the writing or drawing efforts of the ordinary human user of the device.

Aside from making writing that is distinctive and not readily copyable the instrument may be used for stippling, shading, and obtaining various other decorative and ornamental effects. The amplitude of vibration may be controlled to some degree by the position, manner, firmness, etc. with which the instrument is held by the user. Moreover, much depends on the angle at which the instrument is applied to the writing surface and also to its weight and the relative weight of the eccentric component compared to the mass of the instrument itself and hand of the holder. Dotted lines, vertical vibrations, as well as oval and spiral patterns may readily be produced. The mass of the eccentric weight and its eccentricity or radium of gyration with respect to the driving motor preferably is fairly substantial, whether used for spinning devices or for writing, etc., so that decided impulses are given to the housing which encloses the motor. It is desirable that the eccentric weight, for example, be of such mass as to approach that of the motor or at least be a substantial fractional part thereof. Thus with a one-ounce motor, the eccentric weight should be of at least 0.1 oz. weight and may be substantially more, up to an ounce or more. However, the present invention is not necessarily limited to any particular proportions as long as the eccentricity and mass of the eccentric member as such as to impart substantial vibration that will cause involuntary undulations to occur at the tip of the hand-held writing instrument. Referring to FIGURE 7, it will be seen that very distinctive designs can be made, and these will vary greatly, depending on various positions of contact between the tip and the paper or other writing surface, as well as depending on the length of the pen, the mass of the instrument, and the way in which it is held, including the position as well as the weight or mass of the user's hand.

It is emphasized that the instrument is quite distinctive from those of the known prior art which are generally designed merely to produce geometric patterns with a precalculated and generally invariable amplitude of motion imparted by simple rotation, etc. See, for example, British Patent No. 699,017, Italian No. 545,861 (1956) and Danish, No. 13,015 (1910). Also see U.S. 205,370 and 485,767.

Referring to FIGURE 6, the handle or barrel 301 of the instrument is essentially the same as in FIGURE 5 and the operating parts are similar. Obviously, a spring motor may be used, or a house current electric motor, instead of the battery driven arrangement. By use of a pencil 320, or any straight stick, gripped in the hollow tip 308, spinning devices such as the star wheel 321 may be set into rotary motion. Using the instrument as a sort of whip stock, the spinning prop may be thrown to a considerable distance, producing an interesting flying object, of considerable amusement value. By imparting a slight propellor cant to the blades or tips of the pin wheels, they may be caused to fly and soar, to some extent, as they are thrown into the air. Thus the stick 320 need not be a writing device at all, although it can be.

It will be understood that numerous variations may be made in the design and use of the assembly or any of its parts. It is intended by the claims which follow to cover such, as far as the prior art properly permits. It is recognized that eccentric weight devices have been used in the past for mixing devices, massaging instruments and the like, as in U.S. Patents Nos. 2,425,655, 2,512,621, German Patent 1,088,871 (Class 310–81) and others. To the best of applicants' knowledge they have not been used in devices of the character described above or for similar or analogous purposes.

What is claimed is:

1. A driving device for imparting energetic eccentric vibration to light weight structures, such as spinners, writing instruments and the like, comprising a hollow housing in form adapted to be held and directed in the hand of the user, an elastic motion-transmitting tip on one end of said housing, said tip including connecting means for frictionally engaging and holding a light weight structure, a rotatable motor mounted in said hollow housing and having a rotatable drive shaft, a relatively heavy weight mounted eccentrically on said shaft, the mass of the weight and its speed of rotation being sufficient to impart substantial vibrational energy to said tip and to the structure engaged thereby, a writing instrument gripped by said tip whereby the vibrational energy of said device being sufficient to produce involuntary embellishments on writing or drawing performed by the human user thereof.

References Cited

UNITED STATES PATENTS

| 864,843   | 9/1907  | Hill     | 310—81 |
| 1,006,684 | 10/1911 | Sands    | 310—81 |
| 2,940,326 | 6/1960  | Meyer    | 310—81 |
| 2,965,774 | 12/1960 | Rangus   | 310—89 |
| 3,023,565 | 3/1962  | McKibben | 310—81 |
| 3,196,299 | 7/1965  | Kott     | 310—81 |
| 3,375,381 | 3/1968  | Tavel    | 310—81 |

J D MILLER, Primary Examiner

U.S. Cl. X.R.

310—81; 120—45.6